July 1, 1924.
W. T. POWELL
1,500,034
SYSTEM AND DEVICE FOR BATTERY CHARGING
Filed May 28, 1923
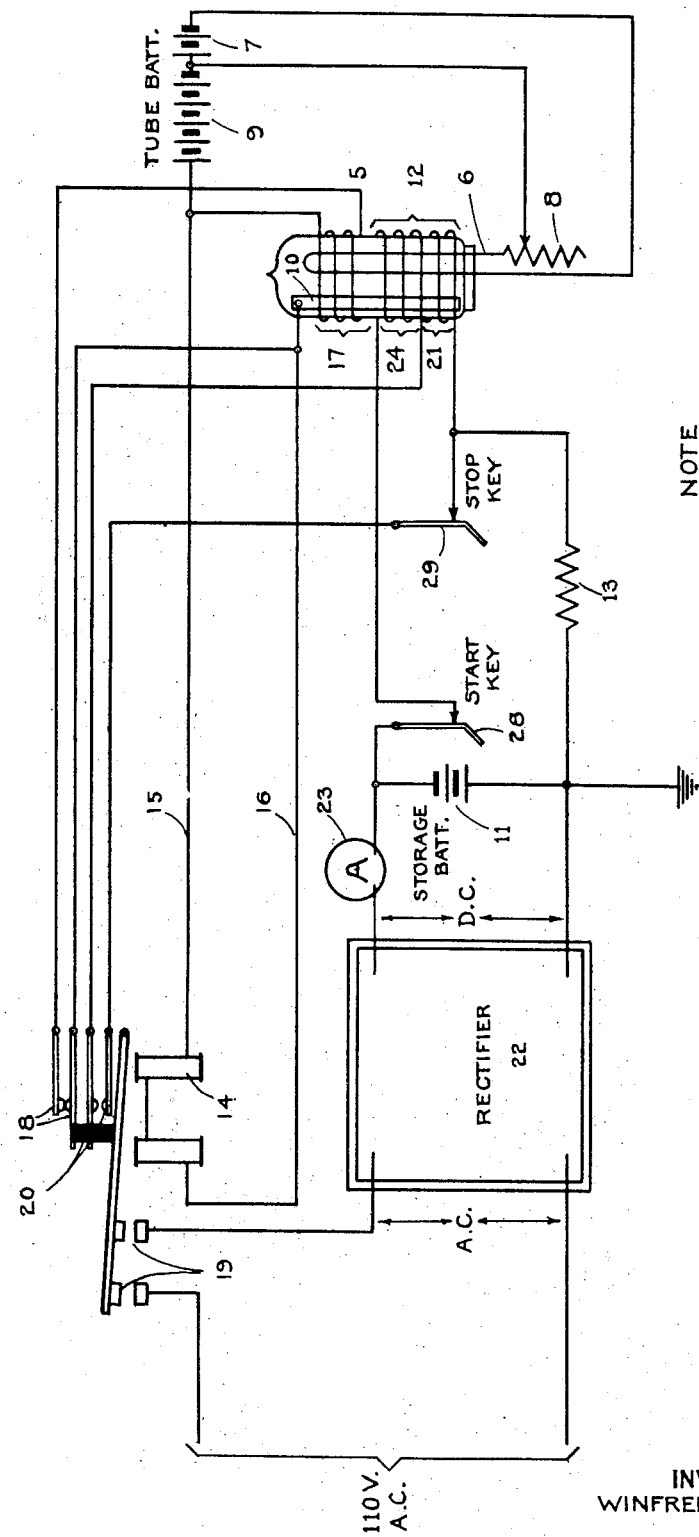
INVENTOR
WINFRED T. POWELL
BY D. Clyde Jones.
ATTORNEY Patented July 1, 1924.

1,500,034

UNITED STATES PATENT OFFICE.

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK.

SYSTEM AND DEVICE FOR BATTERY CHARGING.

Application filed May 28, 1923. Serial No. 641,884.

*To all whom it may concern:*

Be it known that I, WINFRED T. POWELL, a citizen of the United States, residing at Rochester, in the county of Monroe and State of New York, have invented certain new and useful Improvements in a System and Device for Battery Charging, of which the following is a full, clear, concise, and exact description.

This invention relates to a device for automatically controlling the regulation of a rectifying device which functions intermittently to transform alternating current into direct current.

In former arrangements where a rectifying device operated intermittently to transform alternating current into direct current, a plurality of relays have been employed at least one of which is of such complicated structure that it is difficult to maintain in adjustment.

The present invention has for its purpose the provision of a thermionic device which cooperates with a rectifying device for intermittently transforming alternating current into direct current.

More specifically, the present invention is employed in connection with a rectifying device which serves to charge a storage battery or accumulator from an external source of alternating current. The thermionic device functions to start the operating of the rectifying device when the storage battery has been discharged to a certain point and functions to stop the charging of the storage battery when it has been charged to a predetermined point.

The drawing diagrammatically represents the invention, a source of alternating current is only indicated and the rectifying device is likewise indicated by a rectangle. The thermionic device consists both of a filament and a plate or anode enclosed within an evacuated envelope: one or more coils surround the envelope and serve to control electromagnetically the operation of the thermionic device by means of an electromagnetic field.

The thermionic device just referred to, generally designated 5 has its filament heated from a source of direct current 7 through a rheostat 8. The battery 9 serves to maintain the plate 10 at a positive potential and, therefore, a space current normally tends to flow from the filament 6 to the plate 10. However, when the storage battery 11 is charged within predetermined limits, the magnetic coil 12 enclosing the evacuated envelope by reason of its magnetic field prevents this space current flowing between the elements within the evacuated envelope.

It will be noted that the resistance coil 13 is included in the circuit from the storage battery 11 to the magnetically controlled coil 12. This external resistance coil is employed since it requires a magnetic field of relatively low value to prevent current flow in the circuit between the filament and plate. When, however, the battery 11, is thus operated to a predetermined point, such for example as twenty-two volts the magnetic field of the coil 12 is reduced to such a point that it fails to "block" all of the current in the filament plate circuit, with the result that relay 14 is operated in a circuit including the conductor 15, battery 9, filament 6, plate 10, conductor 16 and the windings of relay 14. It will be noted that a second coil 17, which encloses the evacuated envelope or tube, is included in a circuit in multiple of that just described which circuit is completed through the back contacts 18 of the relay 14. Current flowing between the filament and plate through the circuits just described will divide, part of which will pass through the winding of the coil 17. This coil 17 is in opposition to coil 12 with the result that the magnetic field about the envelope will be further reduced so that sufficient current will flow through the circuit including relay 14 to actuate it. This relay on operation closes its sets of carbon contacts 19 and also closes the contact springs 20. The operation of this relay also opens the spring 18 to interrupt the circuit including the coil 17.

The closure of the contact springs 20 short circuits a portion of the coil 12, which portion is designated 21. This last operation is effected so that the enclosed magnetic field due to the increased voltage of the battery as it is charged will not tend immediately to block the current flow in the filament plate circuit through the thermionic device. The closure of the carbon contacts 19 of the relay 14 connects the external source of alternating current to a rectifying device generally designated 22. This last named device may be of the two element thermionic type, although it is not limited to such a type of rectifier.

An ammeter designated 23 serves to indicate the rate of charge to the storage battery. When the battery 11 has been charged to a predetermined voltage, the magnetic field produced by the winding 24 is sufficient to interrupt the current flow in the plate filament circuit. This permits relay 14 to release and open its contacts 19 and thereby disconnect the source of alternating current.

The apparatus is now in its normal condition and when the voltage of the storage battery is reduced to a predetermined low point, the above described operation is repeated.

In the event that it is desired to operate the charging of the battery or accumulator 11 under the control of an attendant, it is only necessary to operate the start key 28 and then release the same. The opening of the contacts of this key interrupts the circuit including the control coil 12 so that the space current in the filament plate circuit is no longer "blocked". This permits the relay 14 to operate the switch contacts 19 in the manner already described.

If it is desired to overcharge the battery or accumulator it is only necessary to leave the start key 28 operated so that the automatic control is thereby disabled.

In the event that it is desired to stop the charging of the accumulator before it is charged to a predetermined point, it is only necessary to operate and release the start key 29. This removes the short circuit from coil 21 so that the magnetic control coil 12 "blocks" the space current in the thermionic device and thereby permits relay 14 to retract its armature.

What is claimed is:—

1. In a system of the class described, a source of current, an accumulator, a rectifying device interposed between said accumulator and said source of current, and means including a thermionic device for connecting said source of current to said rectifying device.

2. In a system of the class described, a source of current, an accumulator, a rectifying device interposed between said accumulator and said source of current, a switch for controlling the connection of said source of current to said rectifying device, and means including a thermionic device for controlling the operation of said switch.

3. In a system of the class described, a source of current, an accumulator, a rectifying device connected to said accumulator, means including conductors and a switch for connecting said source of current to said rectifying device, and means including a three-element thermionic device for controlling the operation of said switch.

4. In a system of the class described, an accumulator, a source of current, conductors and a rectifying device for inter-linking said source of current and said accumulator, and means including a thermionic device for controlling the interlinking of said accumulator with said source of current.

5. In a system of the class described, an accumulator, a source of alternating current, a rectifying device interlinking between said source of current and said accumulator, a switch for controlling the completion of said interconnection, means including a thermionic device operable when the current from said accumulator reaches predetermined values for operating said switch.

6. In a system of the class described, an accumulator, a two element thermionic current rectifying device connected to said accumulator, a source of current, leads for connecting said source of current to said rectifying device, a switch for interrupting one of said leads, a thermionic device having a plate, a filament and a control element, a relay for operating said switch in said conductor and a circuit for said relay including the space between said filament and plate, said control element being associated with said accumulator in such a manner that predetermined values of the current in said accumulator automatically cause said thermionic device to actuate said relay.

7. In a system of the class described, an accumulator, a two element thermionic current rectifying device connected to said accumulator, a source of current, leads for connecting said source of current to said rectifying device, a switch for interrupting one of said leads, a thermionic device having a filament, a plate and a control element, a relay for operating said switch in said conductor, a circuit for said relay including the space between said filament and plate, said control element being connected in series with said accumulator in such a manner that predetermined values of the current in said accumulator automatically cause said thermionic device to actuate said relay.

In witness whereof, I hereunto subscribe my name this 22nd day of May A. D. 1923.

WINFRED T. POWELL.